US012583241B2

(12) United States Patent
Shindo et al.

(10) Patent No.: US 12,583,241 B2
(45) Date of Patent: Mar. 24, 2026

(54) PRINTING APPARATUS, CONTROL METHOD THEREOF, AND CONVEYANCE APPARATUS

(71) Applicant: CANON KABUSHIKI KAISHA, Tokyo (JP)

(72) Inventors: Yuki Shindo, Kanagawa (JP); Haruhiko Tanami, Tokyo (JP); Arashi Shimazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 18/459,300

(22) Filed: Aug. 31, 2023

(65) Prior Publication Data

US 2024/0075757 A1     Mar. 7, 2024

(30) Foreign Application Priority Data

Sep. 2, 2022    (JP) ................................. 2022-140204

(51) Int. Cl.
 *B41J 13/00*        (2006.01)
 *G06K 15/00*        (2006.01)
(52) U.S. Cl.
 CPC ...... *B41J 13/0009* (2013.01); *G06K 15/4025* (2013.01)

(58) Field of Classification Search
 CPC .... B41J 11/007; B41J 13/0009; B41J 29/393; B41J 13/03; B41J 23/14; B41J 19/202; B41J 29/38; B41J 2/16517; G06K 15/16; G06K 15/4025
 See application file for complete search history.

(56) References Cited

U.S. PATENT DOCUMENTS

2008/0008513 A1 *    1/2008    Kakishima ............... B41J 13/03
                                                                    400/579

FOREIGN PATENT DOCUMENTS

| JP | 2005247488 A | * | 9/2005 |
| JP | 2006273559 A | | 10/2006 |
| JP | 2012213863 A | | 11/2012 |
| JP | 2014009085 A | | 1/2014 |

* cited by examiner

*Primary Examiner* — Jannelle M Lebron
(74) *Attorney, Agent, or Firm* — Canon U.S.A., Inc. IP Division

(57)          ABSTRACT

A printing apparatus includes a printing unit, a conveyance unit, a motor, and a control unit. The printing unit performs printing on a sheet. The conveyance unit conveys the sheet to a printing position for the printing unit. The motor drives the conveyance unit. The control unit executes control. The control unit stops the motor which is rotating at a target position, executes holding control to hold the motor at a stop position, and updates, during execution of the holding control, the target position to a position different than the target position based on a rotational speed of the motor.

12 Claims, 10 Drawing Sheets

F I G. 2
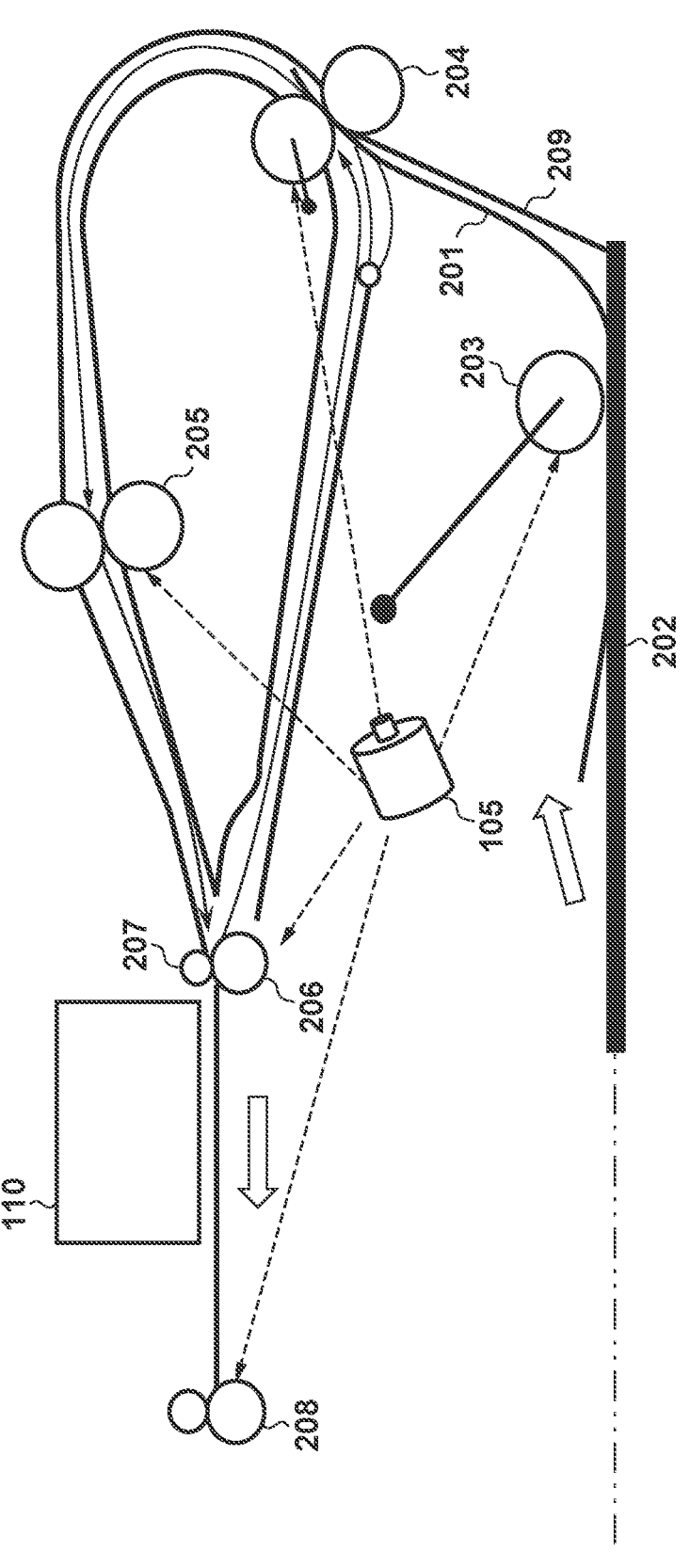

F I G. 4
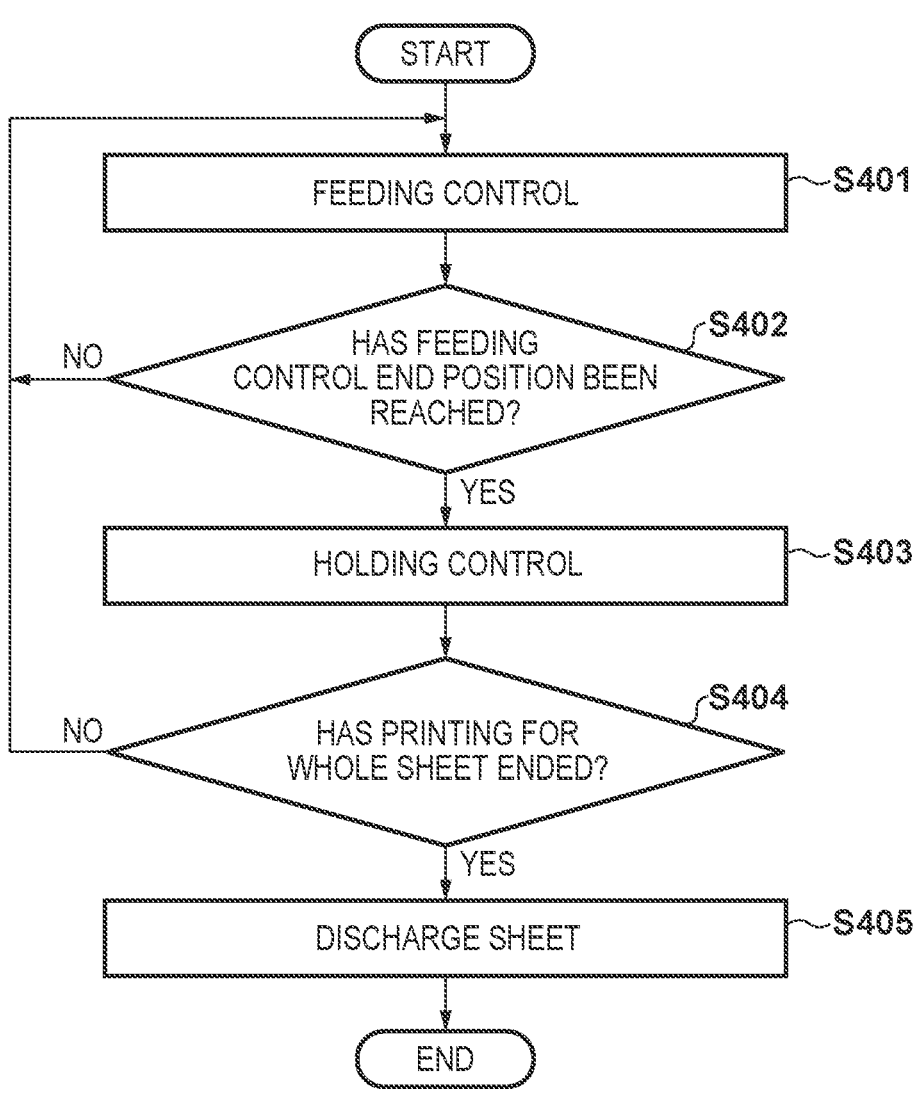

F I G. 5
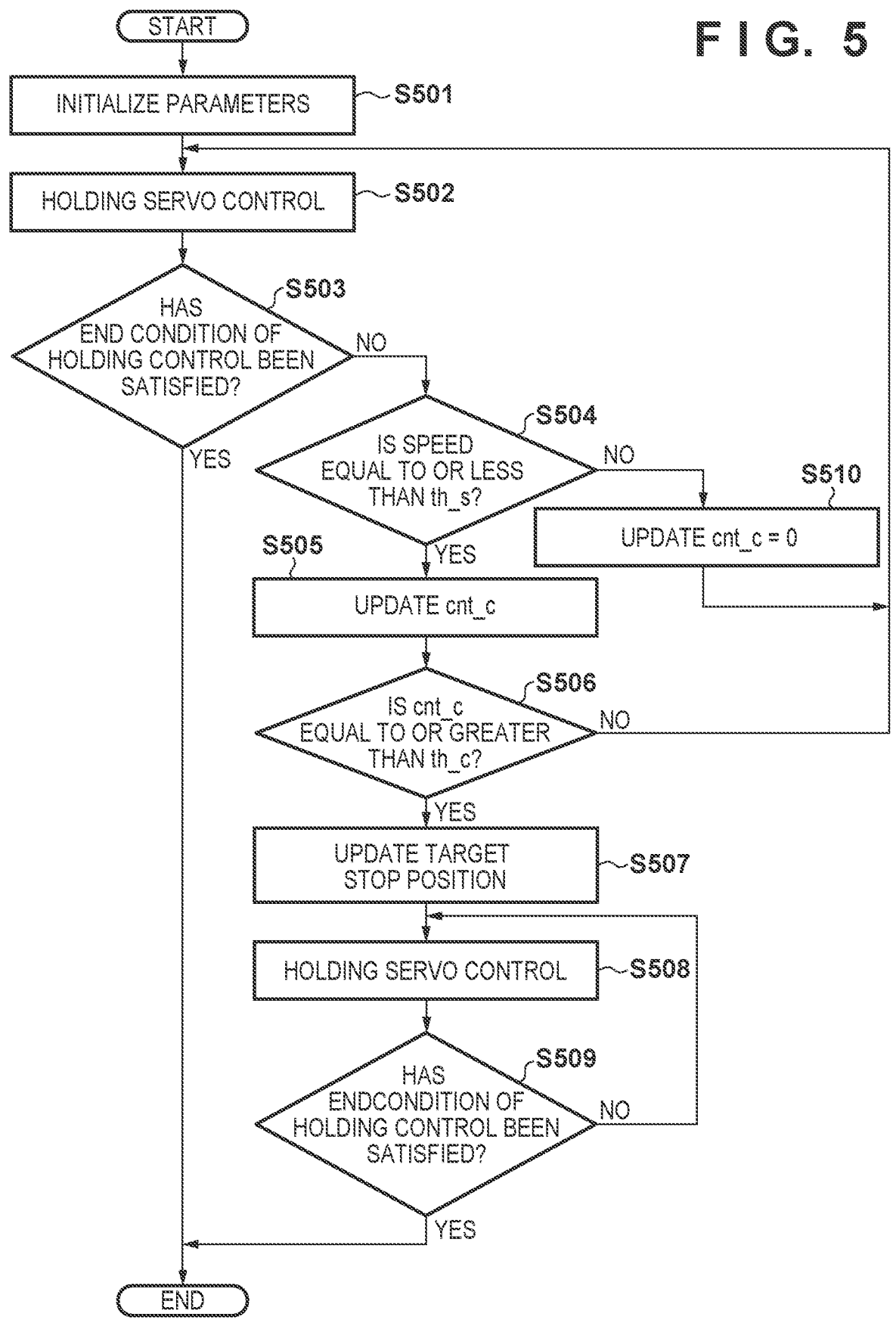

FIG. 7

CONVEYANCE DIRECTION

FEEDING CONTROL
END POSITION
PRINT WIDTH

701

702

703

201 t_1 t_2 t_3

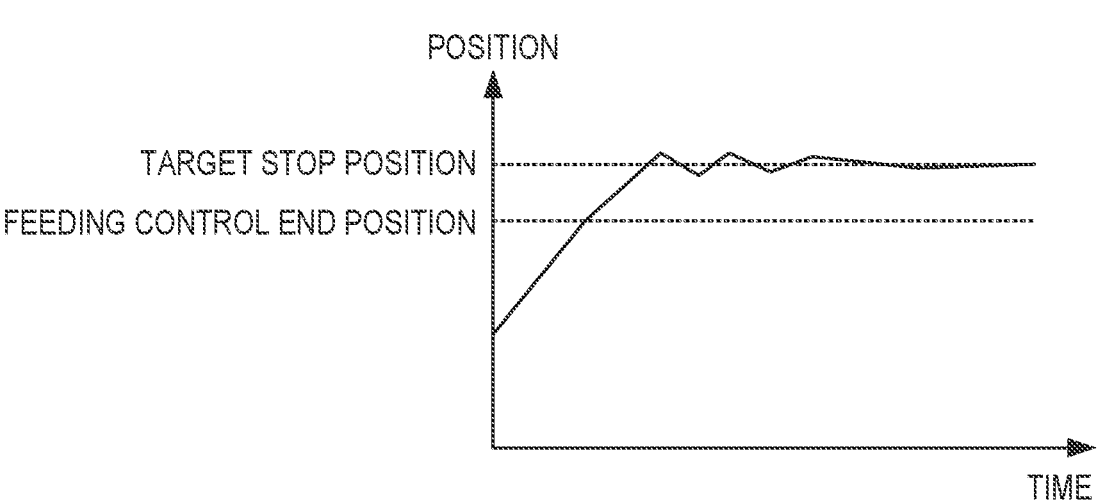
F I G. 10A
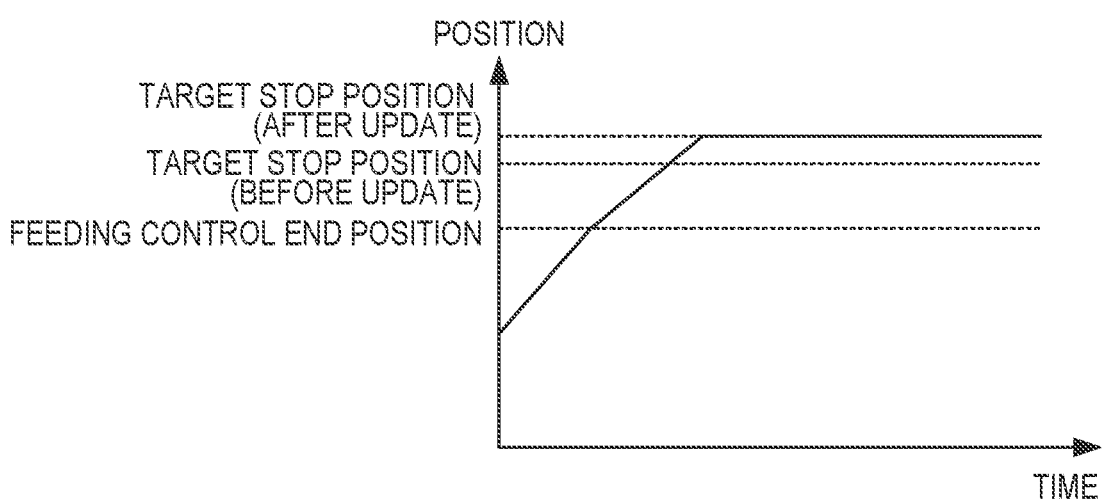
F I G. 10B

PRINTING APPARATUS, CONTROL METHOD THEREOF, AND CONVEYANCE APPARATUS

BACKGROUND

Field

The present disclosure relates to a printing apparatus, a control method thereof, and a conveyance apparatus.

Description of the Related Art

In an inkjet printer, which is an example of a printing apparatus, printing is performed by repeating conveyance of a sheet at a predetermined distance and discharging ink onto the sheet with a print head. In such a printing apparatus, when the sheet being conveyed is stopped, a force in a direction opposite to the conveyance direction may be exerted on the sheet due to resistance or the like of a component of the conveyance mechanism. This force may cause the temporarily stopped sheet to be returned in a direction opposite to the conveyance direction. In order to mitigate such a phenomenon, Japanese Patent Laid-Open No. 2006-273559 discloses controlling a current value flowing through a motor that drives a conveyance mechanism such that the motor stops at a target stop position.

Adjusting the current value flowing through the motor so as to eliminate the difference between the current position of the motor and the target stop position is considered as a method of stopping the motor at the target stop position. However, in such a method, when the actual stop position of the motor exceeds the target stop position, the motor may rotate in a direction opposite to the conveyance direction in order to return to the target stop position. When the motor rotates in a direction opposite to the conveyance direction, there is a possibility that the sheet will become warped or that backlash will occur due to the motor repeating forward rotation and reverse rotation.

SUMMARY

The present disclosure provides a technique for improving a stopping operation of a motor for conveying a sheet.

According to an aspect of the present disclosure, a printing apparatus includes a printing unit configured to perform printing on a sheet, a conveyance unit configured to convey the sheet to a printing position for the printing unit, a motor configured to drive the conveyance unit, and a control unit configured to execute control, wherein the control unit is configured to stop the motor which is rotating at a target position, is configured to execute holding control to hold the motor at a stop position, and is configured to update, during execution of the holding control, the target position to a position different than the target position based on a rotational speed of the motor.

Further features of the present disclosure will become apparent from the following description of exemplary embodiments (with reference to the attached drawings).

BRIEF DESCRIPTION OF THE DRAWINGS

FIG. 2 is a cross-sectional view schematically illustrating an internal structure of the printing apparatus.

FIG. 4 is a flowchart illustrating an example of processing of a CPU.

FIG. 5 is a flowchart illustrating an example of processing of the CPU.

FIG. 7 is a view illustrating a summary of printing processing according to an embodiment.

FIG. 10A and FIG. 10B are views illustrating an additional comparison in cases of executing and not executing a holding control of the present embodiment.

DESCRIPTION OF THE EMBODIMENTS

Figure 1:
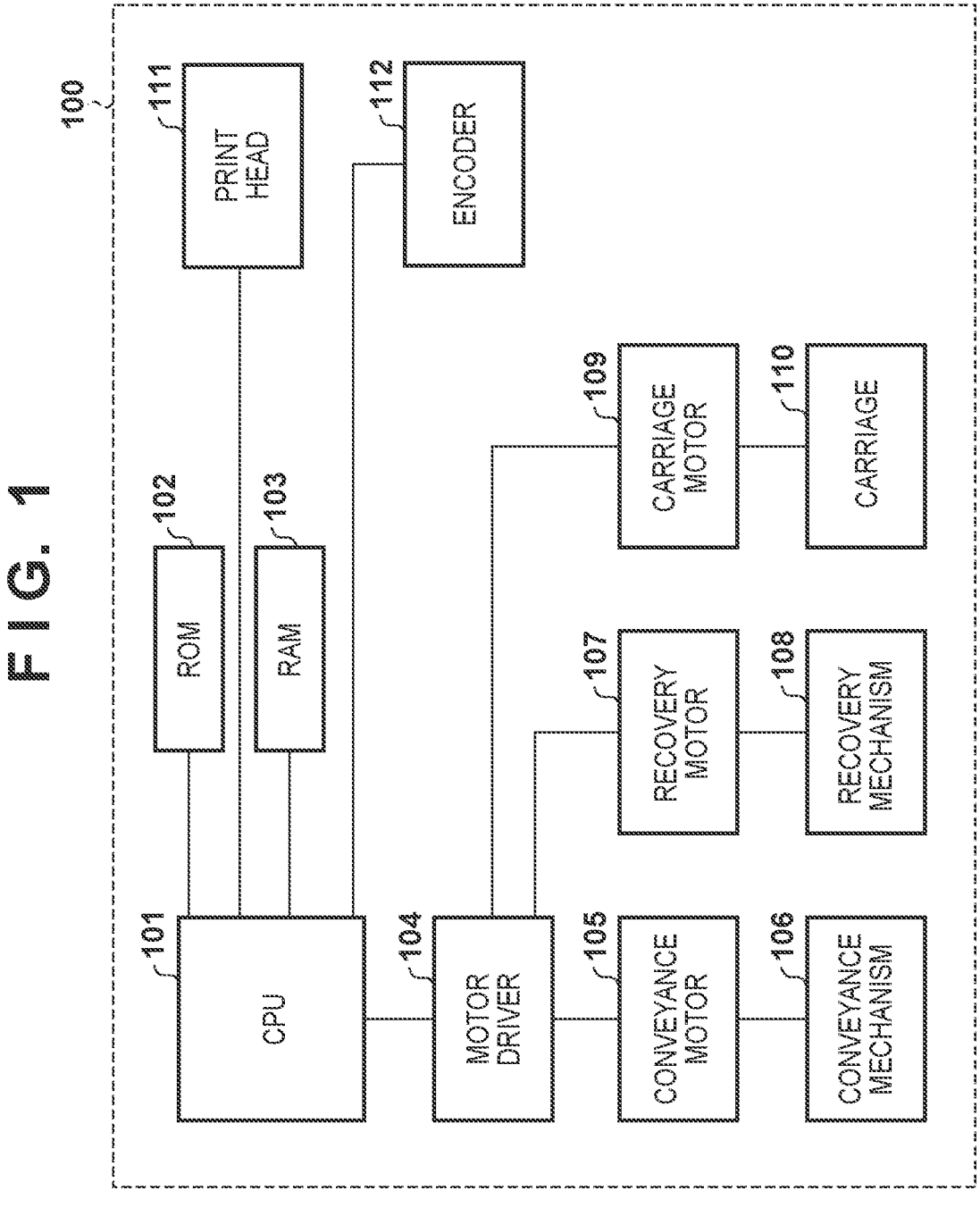
FIG. 1 is a block diagram of a printing apparatus according to an embodiment.

Hereinafter, embodiments will be described in detail with reference to the attached drawings. Note, the following embodiments are not intended to limit the scope of the subject matter of the claimed terms. Multiple features are described in the embodiments, but limitation is not made that requires all such features, and multiple such features may be combined as appropriate. Furthermore, in the attached drawings, the same reference numerals are given to the same or similar configurations, and redundant description thereof is omitted.

First Embodiment

<Summary of Printing Apparatus>

FIG. 1 is a block diagram of a printing apparatus 100 according to the embodiment. The printing apparatus 100 includes a Central Processing Unit (CPU) 101, a Read Only Memory (ROM) 102, a Random Access Memory (RAM) 103, a motor driver 104, a conveyance motor 105, a conveyance mechanism 106, a recovery motor 107, a recovery mechanism 108, a carriage motor 109, a carriage 110, a print head 111, and an encoder 112.

The CPU 101 performs processing and control of overall operation related to the printing apparatus 100. The CPU 101 realizes various functions of the printing apparatus 100 by reading and executing programs stored in the ROM 102. That is, information processing by software stored in the ROM 102 is specifically realized by the CPU 101, which is one example of hardware, and thereby various functions are realized.

The ROM 102 is a non-volatile memory for storing programs executed by the CPU 101 and various types of permanent data. The RAM 103 is a volatile memory and functions as a working memory of the CPU 101.

The motor driver 104 is an integrated circuit (IC) for controlling the conveyance motor 105, the recovery motor 107, and the carriage motor 109.

The conveyance motor 105 is a motor that drives the conveyance mechanism 106. The recovery motor 107 is a motor for driving the recovery mechanism 108. The carriage motor 109 is a motor that drives the carriage 110.

The conveyance mechanism 106 is a mechanism that conveys a sheet to a printing position by the print head 111. The conveyance mechanism 106 includes a plurality of rollers that are rotated by the conveyance motor 105. The plurality of rollers pulls a sheet into the printing apparatus 100 as a printing target, and discharges the sheet from the printing apparatus 100 after printing. Details will be described later (with reference to FIG. 2).

The recovery mechanism 108 is a mechanism that is driven by the recovery motor 107 for performing recovery processing. The recovery processing is processing for satisfactorily maintaining the ink discharge state of the print head 111 mounted on the carriage 110. The recovery processing includes, for example, suction processing. The suction processing is processing for discharging bubbles and thickened ink that occur in the nozzles by sucking ink from a plurality of nozzles formed in the print head 111, and replacing the ink in the nozzles with ink in a state suitable for discharge. For example, the suction processing is executed by driving a suction pump by the rotation of the recovery motor 107.

The carriage 110 includes the print head 111 and an ink tank (not shown) and is configured to be reciprocally movable. The print head 111 performs printing by discharging ink onto a sheet as a printing medium. Specifically, the print head 111 performs printing on the sheet by discharging ink in synchronization with the reciprocating movement of the carriage 110. The encoder 112 detects the physical rotation of the conveyance motor 105.

FIG. 2 is a cross-sectional view schematically illustrating an internal structure of the printing apparatus 100. The conveyance mechanism 106 includes a sheet feed roller 203, a first intermediate roller 204, a second intermediate roller 205, a conveyance roller 206, and a sheet discharge roller 208. These rollers are rotated by the conveyance motor 105. The conveyance mechanism 106 includes a pinch roller 207 driven by the conveyance roller 206.

When the various rollers are rotated by the conveyance motor 105, first, a sheet 201 is conveyed from a sheet feed tray 202 along an inclination 209 of the cassette by the sheet feed roller 203. Thereafter, the sheet 201 is conveyed by the first intermediate roller 204, the second intermediate roller 205, and the conveyance roller 206 to the lower side of the carriage 110 on which the print head 111 is mounted. Then, printing processing is performed on the printing target 201 conveyed to the lower side of the carriage 110. Note that the number and arrangement of rollers driven by the conveyance motor 105 may be changed according to the length of the conveyance path and the length of the corresponding sheet.
<Control Configuration>

Figure 3:
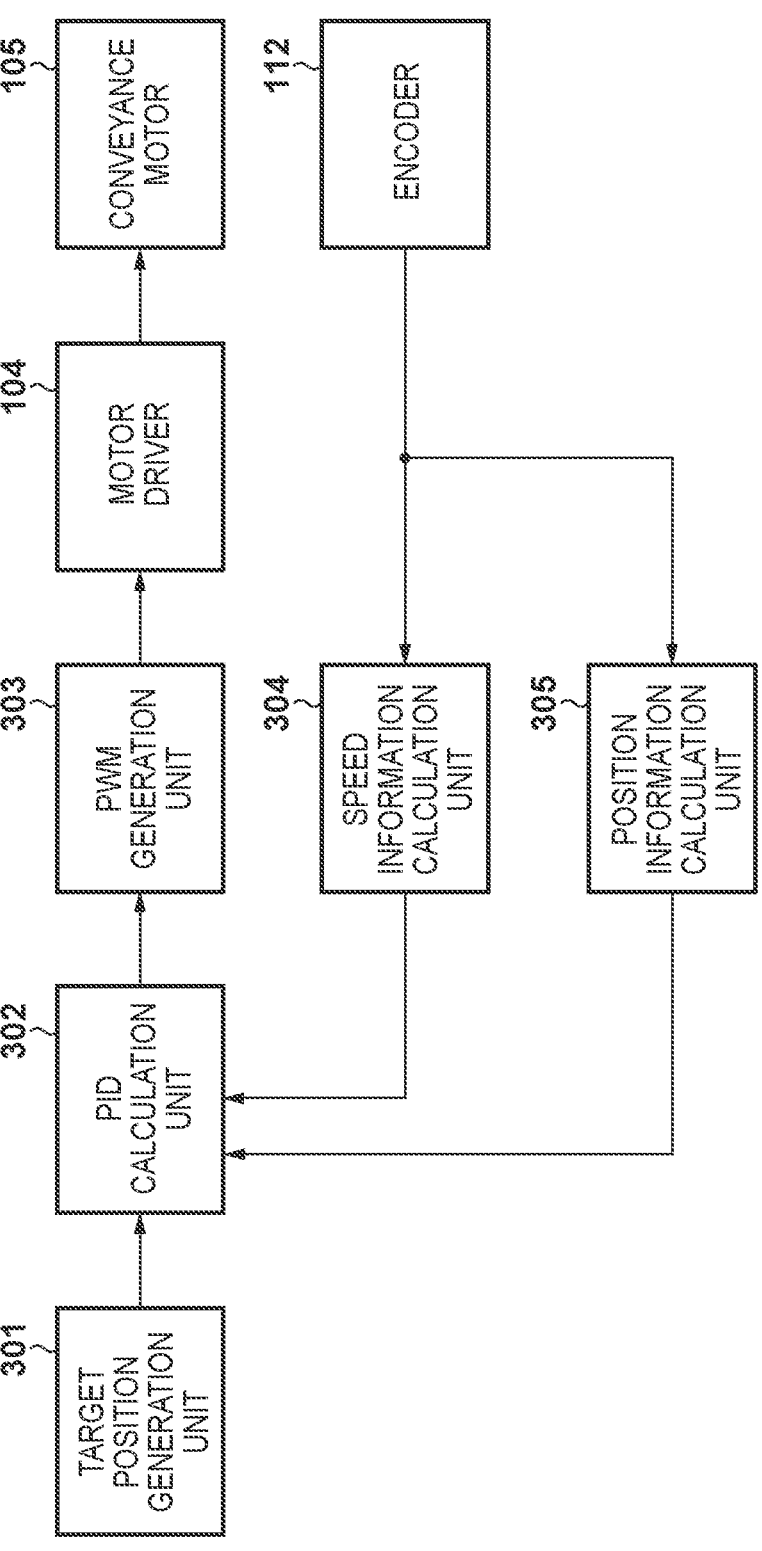
FIG. 3 is a view illustrating a control configuration of the conveyance motor.

FIG. 3 is a view illustrating a control configuration of the conveyance motor 105. In the present embodiment, the CPU 101 controls the conveyance motor 105 by servo control. For example, the CPU 101 realizes functions as a target position generation unit 301, a Proportional-Integral-Differential (PID) calculation unit 302, a Pulse Width Modulation (PWM) generation unit 303, a speed information calculation unit 304, and a position information calculation unit 305 by reading programs stored in the ROM 102 to the RAM 103 and executing them. Alternatively, dedicated one or more circuits that function as each unit may be provided. Further, the servo control illustrated in FIG. 3 is merely an example, and other control modes may be used.

The target position generation unit 301 generates, for each servo control, a target position that gradually increases as time progresses to a target stop position of the conveyance motor 105. The target position is, for example, a position at which printing by the print head 111 is to be started for the sheet 201.

The PID calculation unit 302 calculates, by a PID calculation, the energy to be applied to the motor based on the target position generated by the target position generation unit 301, the speed of the motor obtained from the speed information calculation unit 304, and the position of the motor obtained from the position information calculation unit 305. In the servo control, a common method is to use a PID calculation, in which calculations for a proportional term P, an integral term I, and a derivative term D are performed.

The PWM generation unit 303 calculates a PWM value to be set for the motor driver 104 based on the calculation result of the PID calculation unit 302. The PWM value is a temporal ratio between on and off of a pulse-width within a predetermined period of time, ranging from 0% to 100%. The larger the PWM value, the larger the power supplied to the motor.

The speed information calculation unit 304 calculates the rotational speed of the conveyance motor 105 from the rotation angle of the conveyance motor 105 based on the detection result of the encoder 112 and a time measurement value of a timer or the like incorporated in the printing apparatus 100.

The position information calculation unit 305 accumulates the rotation angle of the conveyance motor 105 based on the detection results of the encoder 112, and calculates position information of the conveyance motor 105.

As described above, the speed of the conveyance motor 105 is calculated by the speed information calculation unit 304 and the position information of the conveyance motor 105 is calculated by the position information calculation unit 305 by using the detection results of the encoder 112. Note that the encoder 112 is configured by an optical sensor having a light emitting unit that emits light and a light receiving unit that receives light, and a code wheel having a hole that transmits light. The code wheel is coaxial with the rotation axis of the conveyance motor 105. Note that the encoder may be configured to detect the physical rotation of the conveyance roller 206.
<Summary of Printing Processing>

Figure 7:
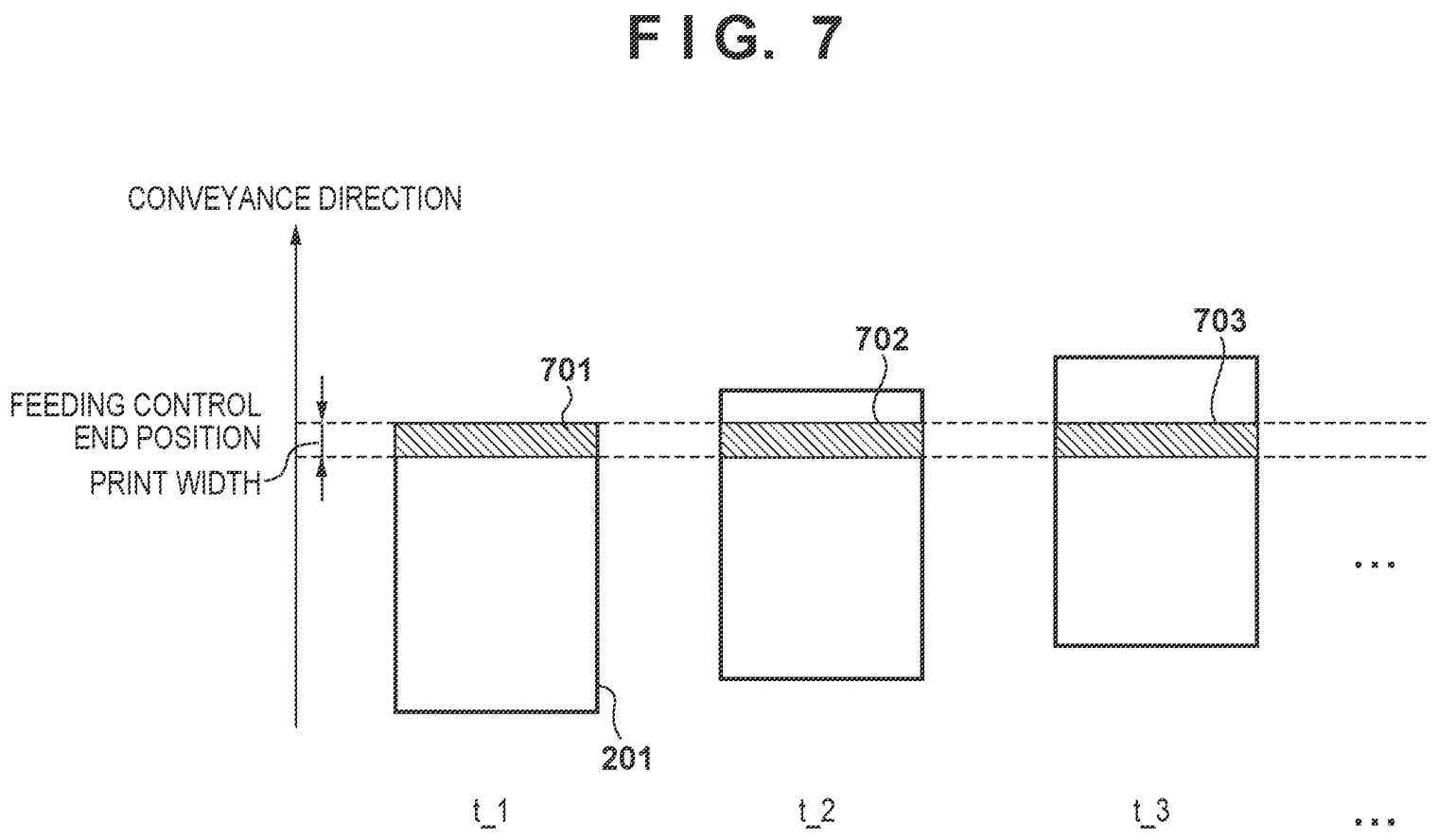

FIG. 7 is a view illustrating a summary of the printing processing.

Specifically, FIG. 7 is a view for describing processing of repeating the conveyance of the sheet 201 and the printing for the width of the print head 111 and executing the printing on the entire printing region of the sheet 201. At a timing t_1, the conveyance mechanism 106 conveys the sheet 201 such that the front end portion of the sheet 201 in the conveyance direction falls within the print width of the print head 111. Then, the print head 111 performs printing with respect to a printing region 701. Thereafter, at a timing t_2, the conveyance mechanism 106 conveys the sheet 201 such that the end portion of the printing region 701 on the upstream side in the conveyance direction at the timing t_1 is positioned at the end portion of the downstream side of the print width of the print head 111. Then, the print head 111 performs printing with respect to a printing region 702. Thereafter, at a timing t_3, the conveyance mechanism 106 conveys the sheet 201 such that the end portion of the printing region 702 on the upstream side in the conveyance direction at the timing t_2 is positioned at the end portion on the downstream side of the print width of the print head 111. Then, the print head 111 performs printing with respect to a printing region 703. By repeatedly performing such an operation, printing can be performed on the entire printing region of the sheet 201.

Incidentally, in a case where the sheet 201 is repeatedly conveyed and stopped for each print width as described above, a force (reaction force) in a direction opposite to the conveyance direction may be exerted on the sheet due to resistance or the like of a component of the conveyance mechanism 106 when the sheet 201 is stopped. Then, this force may cause the temporarily stopped sheet 201 to be returned in a direction opposite to the conveyance direction. In the present embodiment, the sheet 201 that has been stopped being returned in the direction opposite to the conveyance direction is suppressed by the following processing.

<Example of Processing>

FIG. 4 is a flowchart illustrating exemplary processing of the CPU 101 in the conveyance control. In the present embodiment, the conveyance control of the sheet 201 is performed by controlling the conveyance motor 105 at regular periods by the servo control in FIG. 3. Further, in the present embodiment, the conveyance control includes feeding control for conveying the sheet 201 a predetermined distance, and a holding control for stopping the sheet at a target position and holding the sheet at that position. In addition, this flowchart illustrates the flow up until the printing by the print head 111 has ended for one sheet 201.

In step S401, the CPU 101 executes the feeding control of the sheet 201. For example, the CPU 101 causes the sheet 201, which may be printing paper or the like, to be conveyed to a position for printing by executing the servo control of FIG. 3 at every control period of the conveyance motor 105 to operate the conveyance motor 105. For example, the feeding control may be executed when the sheet 201 is conveyed from the sheet feed tray 202 to a printing start position under the carriage 110. Further, for example, the feeding control may be executed in cases such as when the sheet 201 is conveyed by a distance corresponding to one pass of the print head 111 during the printing processing.

In step S402, the CPU 101 determines whether or not the sheet 201 has reached the feeding control end position. The CPU 101 advances the processing to step S403 in a case where the sheet has reached the end position, and if that is not the case, returns the processing to step S401. Note that the feeding control end position is a position different from the target stop position described later, and more specifically, is a position a predetermined amount in front of the target stop position. However, it is also possible to adopt a configuration in which the end position of the feeding control and a target stop position (before updating) to be described later are set to the same position.

In step S403, the CPU 101 executes the holding control of the sheet 201. The holding control is control for stopping the rotating conveyance motor 105 at a target position and holding the conveyance motor 105 at the stop position. When the sheet 201 is conveyed, a force in a direction opposite to the conveyance direction may be applied to the sheet 201 by an external force such as resistance of a component of the conveyance mechanism 106. Therefore, when the servo control has ended after the sheet 201 reaches the stop position, the conveyance motor 105 may be returned from the stop position in the reverse rotation direction (the rotation direction opposite to the rotation direction when the sheet 201 is conveyed in the conveyance direction). Thus, in the present embodiment, by controlling the conveyance motor 105 by executing the holding control even after the stop position is reached, the position of the conveyance motor 105 being returned by an external force is suppressed.

In step S404, the CPU 101 checks whether or not the printing has ended with respect to every printing region of the sheet 201, and if the printing has ended, advances the processing to step S405, or otherwise returns the processing to step S401. That is, the CPU 101 alternatingly executes the feeding control and the holding control until the printing has ended for the every printing region of the sheet 201. In other words, the holding control is executed in a period from the end of the feeding control until the start of the next feeding control.

In step S405, the CPU 101 discharges from the printing apparatus 100 the sheet 201 for which the printing has ended.

By virtue of the processing described above, by executing the holding control, it is possible to intermittently convey the sheet 201 by a predetermined distance while suppressing the return of the sheet 201 due to the reverse rotation at the time of stopping the conveyance motor 105. Therefore, it is possible to improve the accuracy of sheet feeding during the printing operation.

Next the holding control will be further described. FIG. 5 is a flowchart showing an example of the processing of the CPU 101, and shows a specific example of step S403 (holding control) of FIG. 4.

In step S501, the CPU 101 initializes the parameters used in the holding control. In this way, the CPU 101 initializes the target position every time the holding control is executed. In the present embodiment, the parameters to be initialized are a target stop position $pos\_t$, a continuous stop count $cnt\_c$, and a holding control continue count $cnt\_k$.

The target stop position $pos\_t$ is a target stop position in the holding control, and is initialized to a value obtained by adding a predetermined value to the end position of the feeding control used in step S402 of FIG. 4. The target stop position $pos\_t$ is used in holding servo control in step S502 described later. The continuous stop count $cnt\_c$ is a number of times that the motor has continued to be in a state of a rotational speed lower than or equal to a threshold value, and is initialized to 0. The continuous stop count $cnt\_c$ is used in step S505 and step S506 described later. The holding control continue count $cnt\_k$ is a number of times the holding state is continued, and is initialized to 0. The holding control continue count $cnt\_k$ is used in step S503 described later.

In step S502, the CPU 101 performs the holding servo control based on the target stop position $pos\_t$ calculated in step S501. Here, control is performed for one control period for positioning the conveyance motor 105 at the target position.

In step S503, the CPU 101 determines whether or not an end condition of the holding servo control is satisfied, and in a case where an end condition is satisfied, ends the processing, and otherwise advances the processing to step S504. In the present embodiment, it is determined that an end condition of the holding control is satisfied in a case where any of the three conditions of the following condition A, condition B, and condition C is satisfied:

A case where the next feeding control instruction is received (condition A);

A case where the difference between the current motor position and the target stop position is greater than or equal to a threshold value $th\_p$ (condition B); and A case where the continuous operation time of the holding control is greater than or equal to the threshold value $th\_k$ (condition C).

Hereinafter, each condition will be described.

Condition A is a condition for performing the next feeding control. In a case where an instruction for the next feeding control is received, the holding control is ended, and the feeding control for performing the next conveyance is started.

Condition B is a condition for preventing the operation from being disturbed by the holding control when an operation such as extracting the sheet 201 occurs. Since the holding control is control for holding the rotation position of the motor, when the holding control is in operation, the sheet 201 may be difficult to extract. In the present embodiment, in a case where a current position pos_n, a target position p_t, and the threshold value th_p satisfy the following Expression 1, it is determined that an external force (for example, a force for extracting the sheet 201) larger than an external force that is considered to be a cause of the stop position being returned has been borne, and the holding control is ended. Further, the threshold value th_p is a value set based on an envisioned external force at the time of conveyance, and in a case where the holding control is normally operated, Expression 1 below is not satisfied.

$$\text{pos\_}t>\text{pos\_}n+\text{th\_}p \qquad \text{(Expression 1)}$$

As described above, in a case where the stopped conveyance motor 105 rotates by the threshold value th_p or more, the CPU 101 ends the holding control even before a start of a subsequent feeding control.

Condition C is a condition for preventing the holding control from remaining in a continuous state even when an abnormality or the like of the apparatus occurs. The holding control of the present embodiment is processing for applying power to the motor. Therefore, in a case where there is no condition C, even if an abnormality or the like of the apparatus occurs, a state in which power is applied to the motor will continue when the above-described conditions A and B are not satisfied, and the load on the motor will increase. In the present embodiment, in a case where the holding control continues count cnt_k and the threshold value th_k satisfies the following Expression 2, it is determined that the normal holding control cannot be performed, and the holding control is ended. Further, the threshold value th_k is a value that does not satisfy the following Expression 2 when the holding control is normally operated. Therefore, for example, the threshold value th_k is set to be longer than a period in which the carriage 110 and the print head 111 perform a printing operation for one pass.

$$\text{cnt\_}k>\text{th\_}k \qquad \text{(Expression 2)}$$

As described above, in a case where the conveyance motor 105 is stopped for a predetermined period or longer, the CPU 101 ends the holding control even before a start of a subsequent feeding control.

As described above, in the normal state, the CPU 101 ends the holding control based on the instruction to start the subsequent feeding control. In a case where the predetermined condition is satisfied, the CPU 101 ends the holding control even before the start of the subsequent feeding control.

In step S504, the CPU 101 determines whether or not the rotational speed of the conveyance motor 105 is equal to or less than the threshold value th_s, and advances the processing to step S505 in a case where the rotational speed is equal to or less than the threshold value th_s, and otherwise advances the processing to step S510. That is, the CPU 101 advances the processing to step S505 in a case where a rotational speed spd_n and the threshold value th_s of the conveyance motor 105 satisfy the following Expression 3, and advances to step S510 otherwise.

$$\text{spd\_}n \leq \text{th\_}s \qquad \text{(Expression 3)}$$

Here, the CPU 101 makes this determination to determine whether or not the conveyance motor 105 is (substantially) stopped. Therefore, the threshold value th_s is set to a value close to 0 or to 0 so that it can be determined that the conveyance motor 105 is stopped.

In step S505, the CPU 101 updates the continuous stop count cnt_c by Expression 4 below.

$$\text{cnt\_}c=\text{cnt\_}c+1 \qquad \text{(Expression 4)}$$

In step S506, the CPU 101 determines whether or not the continuous stop count is equal to or greater than a threshold value th_c, and advances the processing to step S507 in a case where the continuous stop count is equal to or greater than the threshold value th_c, and otherwise advances the processing to step S502. Furthermore, the threshold value th_c is a value at which the conveyance motor 105 can be determined to have stopped. That is, the CPU 101 can determine that the conveyance motor 105 has stopped when a state in which the rotational speed is equal to or lower than the threshold value th_s continues for a predetermined period. Also, in a case where the continuous stop count cnt_c is less than the threshold value th_c, servo control is continued because the rotational speed of the conveyance motor 105 has not remained less than or equal to the threshold value th_s long enough to be able to determine that the conveyance motor 105 has stopped.

In step S507, the CPU 101 updates the target stop position pos_t. That is, the CPU 101 updates the target stop position pos_t to the present position where the stopped state (state in which the rotational speed is equal to or less than the threshold value th_s) of the conveyance motor 105 continues for a predetermined period. The position at which the conveyance motor 105 continues to be stopped is considered to be a position at which the driving force of the conveyance motor 105 is balanced with the external force at the time of conveyance. Therefore, in a case where the continuous stop count cnt_c is determined to be equal to or greater than the threshold value th_c in step S506, it can be considered that the driving force of the conveyance motor 105 and the external force are balanced and stopped. As described above, the CPU 101 updates the target position to the present position based on the rotational speed of the conveyance motor 105 during execution of the holding control.

Note, by updating the target stop position pos_t in this step, a difference may occur between the target stop position pos_t before the update and the actual stop position. However, in the feeding control of step S401, when the feeding control end position is reached, the parameters of the servo control are set so as to stop at a gentle speed, so that the difference between the actual stop position and the target stop position pos_t becomes sufficiently small, and the difference does not affect the printing result. That is, the CPU 101 may decelerate the rotational speed of the conveyance motor 105 to below the threshold value in the feeding control, and then shift to the holding control.

In step S508, the CPU 101 performs the holding servo control (stop position holding control) based on the target stop position pos_t updated in step S507. Here, control is performed for one control period in order to position the conveyance motor 105 at the target position. However, in the previous steps, the conveyance motor 105 is in a state in which it has already stopped at the updated target stop position pos_t, which is a position balanced with respect to the external force at the time of conveyance. Therefore, the CPU 101 performs servo control so as to hold the target stop position pos_t after updating the position of the conveyance motor 105.

In step S509, the CPU 101 determines whether or not the end condition of the holding control is satisfied, and if the end condition is satisfied, advances the processing to step S511, and if not, returns the processing to step S508. The processing in this step is the similar to that of step S503.

Further, the position of the conveyance motor 105 is held at the updated target stop position pos_t by the processing of step S508 to step S509 until the end condition is satisfied.

Meanwhile, in a case where the processing advances from step S504 to step S510, the CPU 101 updates the continuous stop count cnt_s to 0. That is, since it is determined that the motor is not stopped in step S504, the continuous stop count cnt_s is set to 0 and counting is performed again.

Figure 6:
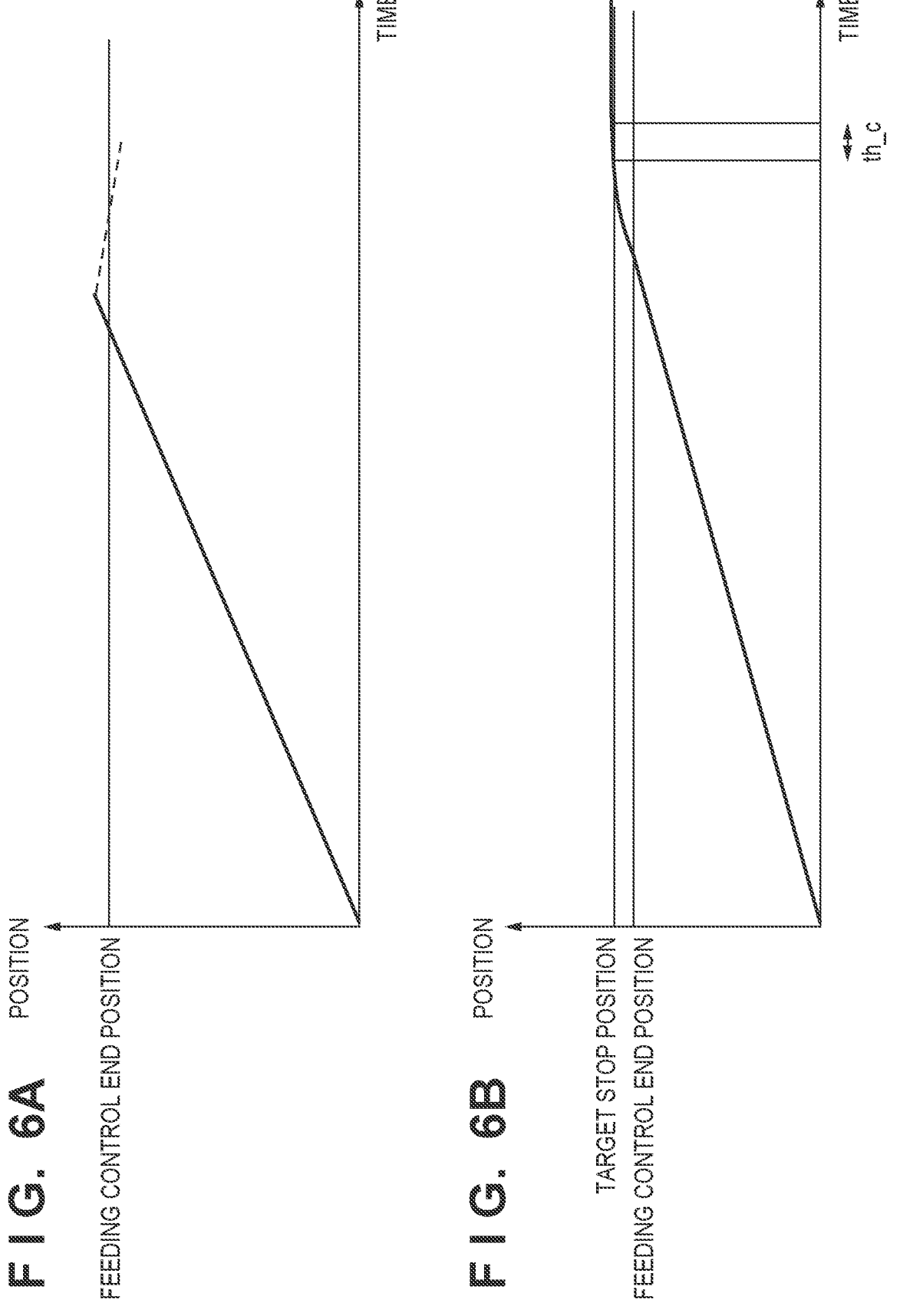
FIG. 6A and FIG. 6B are views illustrating a comparison in cases of executing and not executing a holding control of the present embodiment.

FIG. 6A and FIG. 6B are views illustrating a comparison of cases of not executing and executing the holding control of the present embodiment.

FIG. 6A is a view for describing changes in time and motor position in a case where holding control of the present embodiment is not executed, that is, in a case where a stop position is returned by an external force. When the motor control ends after reaching the feeding control end position, although the conveyance motor 105 temporarily stops after rotating by a predetermined amount with inertia, it may be returned from the stop position by an external force (broken line in FIG. 6A). As described above, when the rotation position of the conveyance motor 105 is returned, the sheet 201 retreats in the direction opposite to the conveyance direction. As a result, printing is performed at a position different from the original printing position on the sheet 201, and a desired printing result may not be obtained in some cases. As a specific example, in FIG. 7, a region in which printing is performed at the timing t_1 and a region in which printing is performed at the timing t_2 may overlap in the conveyance direction. In addition, streaks may occur in the overlapping portions. As described above, in the printing apparatus 100, when the conveyance motor 105 has not stopped at a desired stop position, deterioration in image quality of the printed product may occur.

FIG. 6B is a view showing a change in time and motor position in a case where the holding control is performed in the present embodiment. Since the state where the motor is stopped is a position where a state of balance against the external force at the time of conveyance continued for the threshold value th_c, the position is set as the updated target stop position pos_t, and by performing the holding servo control, the rotation position of the conveyance motor 105 can be held without the conveyance motor 105 reversely rotating.

FIG. 10A and FIG. 10B are views illustrating an additional comparison in cases of not executing and executing the holding control of the present embodiment.

FIG. 10A shows a case where the holding control of the present embodiment is not executed, and a deviation between the current position of the conveyance motor 105 and the target stop position is fed back to the position control of the conveyance motor 105 so that the conveyance motor 105 stops at the target stop position. In this case, when the conveyance motor 105 stops beyond the target stop position, the conveyance motor 105 is controlled to reverse rotation in order to stop the conveyance motor 105 at the target stop position. In some cases, warping of the sheet 201 occurs due to the reverse rotation of the conveyance motor 105. Alternatively, backlash may occur in the power transmission system by repeating forward rotation and reverse rotation of the conveyance motor 105.

FIG. 10B is partial magnification view of FIG. 6B, and is a view showing a change in time and motor position in a case where the holding control is performed in the present embodiment. In the present embodiment, even when the conveyance motor 105 exceeds the target stop position, the target stop position is updated at the time point when the conveyance motor 105 stops. Therefore, in the holding control, the control is performed so as to hold the current position, which is the position where the conveyance motor 105 is stopped. Therefore, the reverse rotation of the conveyance motor 105 as shown in the FIG. 10A can be suppressed.

As described above, according to the present embodiment, by executing the holding control when the conveyance motor 105 is stopped, it is possible to suppress the rotation of the conveyance motor 105 in the direction opposite to the conveyance direction due to an external force. Then, by updating the target stop position pos_t to the current position based on the rotational speed of the conveyance motor 105 during the execution of the holding control, it is possible to suppress rotation of the conveyance motor 105 in the direction opposite to the conveyance direction caused by the control. Therefore, in the stopping operation of the conveyance motor 105 for conveying the sheet 201, rotation in the direction opposite to the conveyance direction can be suppressed.

Furthermore, in the present embodiment, the servo control of the conveyance motor 105 is performed so as to hold a position at which there is balance against the external force at the time of conveyance, so that the stopping accuracy at the time of conveyance can be increased without the motor rotating in the direction opposite to the conveyance direction.

Second Embodiment

In the first embodiment, a configuration in which a motor dedicated to conveyance (the conveyance motor 105) is provided has been exemplified. This embodiment is different from the first embodiment in that a plurality of mechanisms are controlled by one motor. In the case of the second embodiment, it is possible to reduce the number of motors as compared with the first embodiment, and it is possible to reduce the size and cost of the printing apparatus.

Hereinafter, the printing apparatus 800 according to the present embodiment will be described with reference to FIG. 8 to FIG. 9. Note, elements similar to those in the first embodiment are denoted by the same reference numerals, and description thereof will be omitted.

Figure 8:
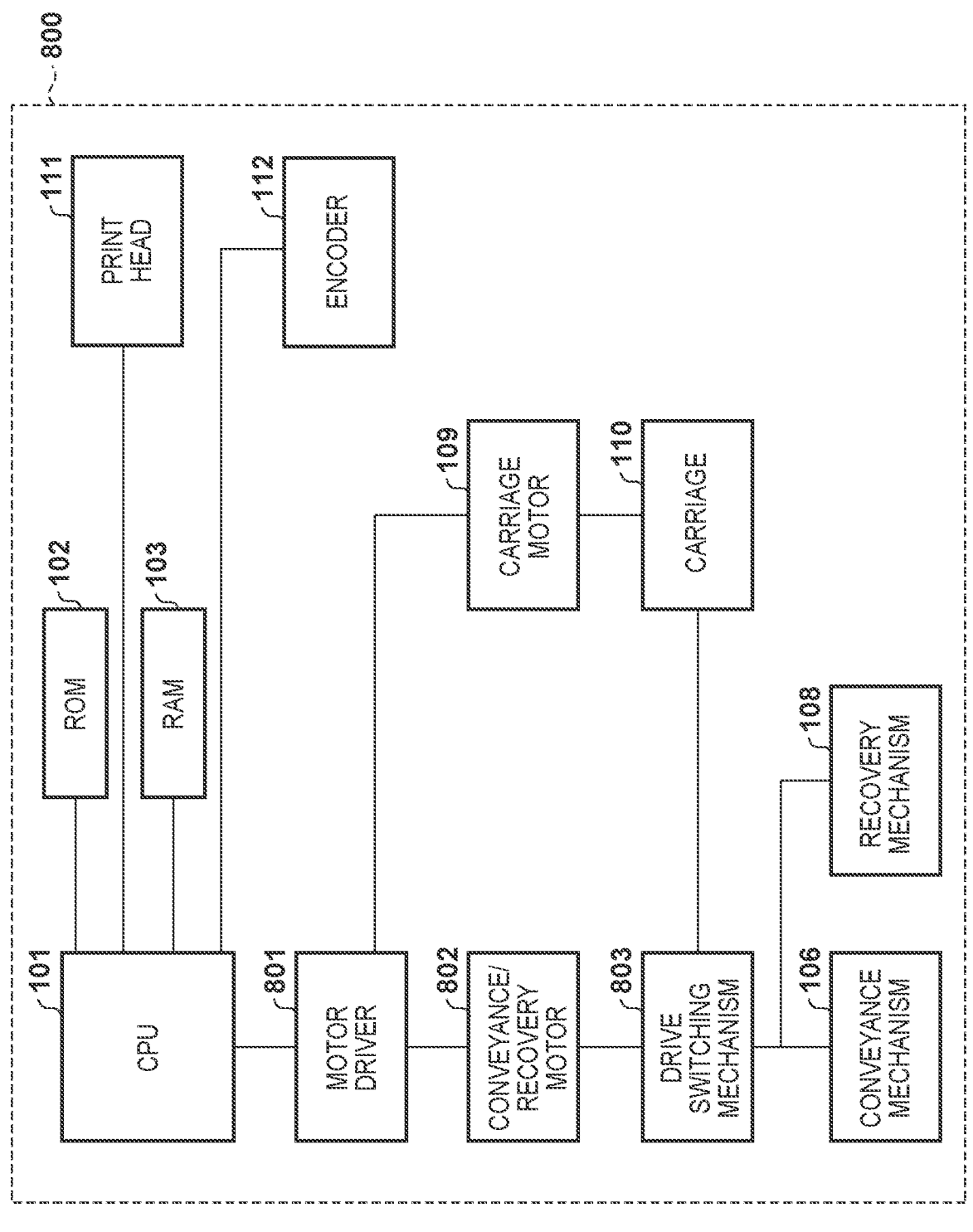
FIG. 8 is a block diagram of the printing apparatus according to an embodiment.

FIG. 8 is a block diagram of a printing apparatus 800 according to an embodiment. The printing apparatus 800 includes the CPU 101, the ROM 102, the RAM 103, the conveyance mechanism 106, the recovery mechanism 108, the carriage motor 109, the carriage 110, the print head 111, a motor driver 801, a conveyance/recovery motor 802, and a drive switching mechanism 803.

The motor driver 801 is an IC for controlling the conveyance/recovery motor 802 and the carriage motor 109.

The conveyance/recovery motor 802 is a motor that operates the conveyance mechanism 106 and the recovery mechanism 108. In the first embodiment, the conveyance mechanism 106 and the recovery mechanism 108 are operated by dedicated motors. In the present embodiment, the printing apparatus 100 operates the conveyance mechanism 106 and the recovery mechanism 108 by one motor by switching the transmission destination of the driving force of the conveyance/recovery motor 802 by the drive switching mechanism 803.

The drive switching mechanism 803 is a mechanism for switching the transmission destination of the driving force of the conveyance/recovery motor 802. Specifically, the drive switching mechanism 803 is a mechanism that switches the transmission destination of the driving force of the conveyance/recovery motor 802 between the conveyance mechanism 106 and the recovery mechanism 108 in conjunction with the movement of the carriage 110.

Figure 9:
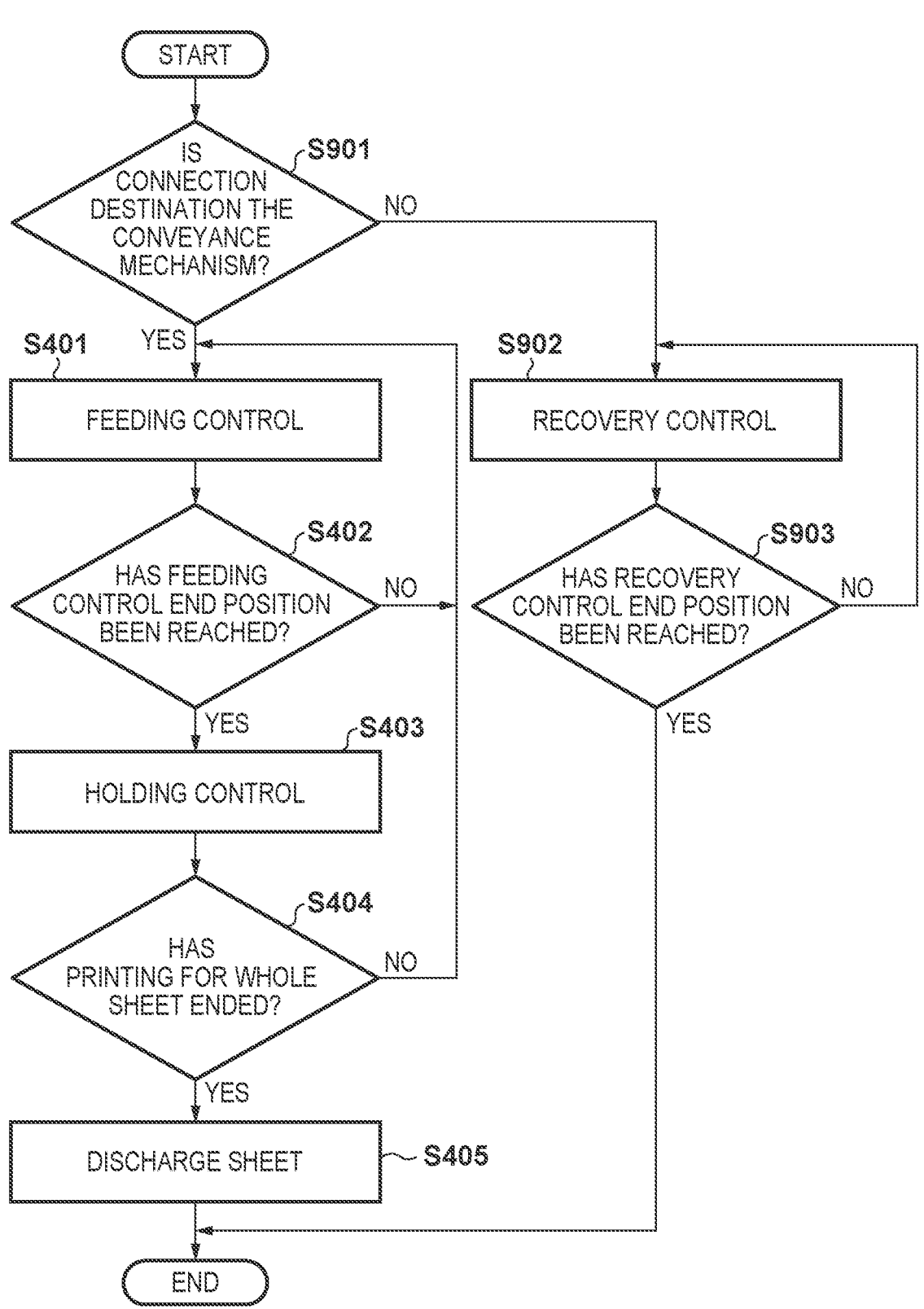
FIG. 9 is a flowchart illustrating an example of processing of the CPU.

A flowchart of the present embodiment is shown in FIG. 9. Note that the same reference numerals are given to similar steps to those in the flowchart of FIG. 4 of the first embodiment.

In step S901, the CPU 101 determines whether or not the transmission destination of the driving force of the conveyance/recovery motor 802 is the conveyance mechanism 106, and if it is the conveyance mechanism 106, advances the processing to step S401, and otherwise advances the processing to step S902.

Step S401 to step S404 are as described with reference to FIG. 4.

On the other hand, in a case where the processing advances to step S902, the CPU 101 executes recovery control. For example, the CPU 101 executes the aforementioned suction processing. At this time, the conveyance/recovery motor 802 drives the suction pump included in the recovery mechanism 108.

In step S903, the CPU 101 determines whether or not the recovery control has ended, and if so, ends the flowchart, and otherwise returns the processing to step S902.

According to this embodiment, the CPU 101 executes the holding control in a case where the transmission destination of the driving force of the conveyance/recovery motor 802 by the drive switching mechanism 803 is the conveyance mechanism 106. On the other hand, the CPU 101 does not execute the holding control when the transmission destination is a mechanism that differs from the conveyance mechanism 106. Thus, in the conveyance operation in which the stopping accuracy of the motor is more required, it is possible to suppress a decrease in the stopping accuracy by executing the holding control. On the other hand, it is possible to reduce the power consumption of the motor by not executing the holding control in an operation in which the stopping accuracy of the motor is relatively not required. That is, it is possible to achieve both securing the stopping accuracy of the motor and reducing the power consumption.

Other Embodiments

In the above-described embodiment, an example in which the holding control is always performed when the conveyance control is performed is shown. However, configuration may be such that, in a case of conveyance that is less susceptible to an external force, the holding control is not performed depending on the type of the sheet to be conveyed and the speed at the time of conveyance.

For example, the ROM 102 may store information in association with the type of the sheet and whether or not the holding control is to be executed. Then, when the instruction for the conveyance control is received, the CPU 101 may determine whether or not to execute the holding control by obtaining information regarding the type of the sheet 201 and comparing that information with the above described information stored in the ROM 102. The printing apparatus 100 may be configured to be able to receive information on the type of the sheet 201 by an input unit such as a touch panel or a hardware key.

Further, for example, the printing apparatus 100 may set the rotational speed of the conveyance motor 105 at the time of the conveyance control in accordance with the size and the type of the sheet, information inputted by the user, or the like. Configuration may be taken such that the holding control is only executed in cases where the rotational speed is equal to or higher than the threshold value.

Further, in the above-described embodiment, a serial inkjet printer is given as an example of the printing apparatus 100, but the features of the above-described embodiment can be appropriately applied to other conveyance apparatuses that sequentially convey sheets by predetermined amounts.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-140204, filed Sep. 2, 2022, which is hereby incorporated by reference herein in its entirety.

What is claimed is:

1. A printing apparatus comprising:

a printing unit configured to perform printing on a sheet;

a conveyance unit configured to convey the sheet to a printing position for the printing unit;

a motor configured to drive the conveyance unit;

a recovery mechanism for performing recovery processing of the printing unit;

a switching unit configured to switch a transmission destination of a driving force of the motor between the conveyance unit and the recovery mechanism; and a control unit configured to execute control, wherein the control unit is configured to stop the motor which is rotating at a target position, is configured to execute holding control to hold the motor at a stop position, and is configured to update, during execution of the holding control, the target position to a position different than the target position based on a rotational speed of the motor, and wherein the control unit is configured to execute the holding control in a case where the transmission destination of the driving force of the motor switched to by the switching unit is the conveyance unit and is configured not to execute the holding control in a case where the transmission destination is the recovery mechanism.

2. The printing apparatus according to claim 1, comprising an encoder configured to detect a position of the motor.

3. The printing apparatus according to claim 1, wherein the control unit is configured to update the target position such that a rotation position of the motor is the target position when the rotational speed has continued to be equal to or less than a first threshold for a predetermined period.

4. The printing apparatus according to claim 1, wherein the control unit is configured to control the motor by servo control.

5. The printing apparatus according to claim 1, wherein the control unit is configured to initialize the target position whenever the holding control is executed.

6. The printing apparatus according to claim 1, wherein the control unit is configured to execute feeding control for controlling the motor such that the conveyance unit conveys a sheet a predetermined distance, and wherein the control unit is configured to execute the holding control for a period from when the feeding control has ended to a start of a subsequent feeding control.

7. The printing apparatus according to claim 6, wherein the control unit is configured to end the holding control even before the start of the subsequent feeding control in a case where a predetermined condition is satisfied.

8. The printing apparatus according to claim 6, wherein the control unit is configured to end the holding control even before the start of the subsequent feeding control in a case where the stopping of the motor continues for equal to or more than a predetermined time.

9. The printing apparatus according to claim 6, wherein the control unit is configured to end the holding control even before the start of the subsequent feeding control in a case where the motor, after stopping, has rotated equal to or more than a first threshold.

10. The printing apparatus according to claim 9, wherein the control unit is configured to decelerate the rotational speed of the motor to equal to or less than a second threshold value in the feeding control before shifting to the holding control.

11. A method for controlling a printing apparatus, wherein the printing apparatus includes a printing unit configured to perform printing on a sheet, a conveyance unit configured to convey the sheet to a printing position for the printing unit, a motor configured to drive the conveyance unit, a recovery mechanism for performing recovery processing of the printing unit, and a switching unit configured to switch a transmission destination of a driving force of the motor between the conveyance unit and the recovery mechanism, the method comprising:

stopping the motor which is rotating at a target position;

executing holding control to hold the motor at a stop position; and updating, during execution of the holding control, the target position to a position different than the target position based on a rotational speed of the motor wherein the holding control is executed in a case where the transmission destination of the driving force of the motor switched to by the switching unit is the conveyance unit and is not executed in a case where the transmission destination is the recovery mechanism.

12. A conveyance apparatus comprising:

a conveyance unit configured to convey a sheet;

a motor configured to drive the conveyance unit;

a switching unit configured to switch a transmission destination of a driving force of the motor between the conveyance unit and a mechanism different than the conveyance unit; and a control unit configured to execute control, wherein the control unit is configured to stop the motor which is rotating at a target position, is configured to execute holding control to hold the motor at a stop position, and is configured to update, during execution of the holding control, the target position to a position different than the target position based on a rotational speed of the motor, and wherein the control unit is configured to execute the holding control in a case where the transmission destination of the driving force of the motor switched to by the switching unit is the conveyance unit and is configured not to execute the holding control in a case where the transmission destination is the mechanism.

* * * * *